(12) United States Patent
McClaran

(10) Patent No.: US 6,230,947 B1
(45) Date of Patent: May 15, 2001

(54) BRACKET MOUNTING DEVICE

(76) Inventor: Robert E. McClaran, Box 181b, R.R. 1, Birmingham, IA (US) 52535

( * ) Notice: Subject to any disclaimer, the term of this patent is extended or adjusted under 35 U.S.C. 154(b) by 0 days.

(21) Appl. No.: 09/425,439

(22) Filed: Oct. 22, 1999

(51) Int. Cl.[7] .................................................. B60R 9/00
(52) U.S. Cl. .................. 224/410; 224/42.32; 224/42.38; 224/545; 224/547; 224/564
(58) Field of Search .................. 224/410, 456, 224/401, 413, 440, 441, 451, 452, 483, 42.32, 42.38, 539, 545, 547, 564, 565, 929; 248/689, 646, 647, 649; D12/420; 296/37.1

(56) References Cited

U.S. PATENT DOCUMENTS

| | | | |
|---|---|---|---|
| D. 305,635 | 1/1990 | Kraklio . | |
| D. 319,730 | * 9/1991 | Steenson | D12/420 X |
| 3,598,295 | 8/1971 | Seegers . | |
| 4,754,901 | 7/1988 | Villanueva et al. . | |
| 4,792,174 | * 12/1988 | Shioda | 296/37.1 X |
| 4,981,243 | 1/1991 | Rogowski . | |
| 5,331,904 | 7/1994 | DiSimone et al. . | |
| 5,651,485 | 7/1997 | Impastato, II . | |
| 5,813,583 | * 9/1998 | Benedeti | 224/483 |
| 5,845,830 | * 12/1998 | Dreiling | 224/440 X |
| 6,041,717 | * 3/2000 | Kubat | 224/564 X |

* cited by examiner

Primary Examiner—Gregory M. Vidovich
Assistant Examiner—Maerena W. Brevard
(74) Attorney, Agent, or Firm—Daniel A. Rosenberg; Kent A. Herink; Davis Brown Law Firm

(57) ABSTRACT

An audio equipment holder and bracket device that conveniently mounts to a vehicle. The device comprises a substantially planer platform for retaining the audio equipment, and at least one leg with the first end secured to the platform, and a second end terminating at a connection point that allows for releasable securement to the vehicle.

1 Claim, 2 Drawing Sheets

BRACKET MOUNTING DEVICE

BACKGROUND OF THE INVENTION

1. Field of the Invention

The present invention relates to an audio equipment holder and bracket device for mounting to a vehicle. In particular, a bracket device with a substantially planer platform for retention of the audio equipment and at least one leg having a first end secured to the platform and a second end with a terminal connection point for releasably securing to the vehicle.

2. Background of the Prior Art

In recent years, a number of small battery operated, highly portable audio equipment devices have been developed for use in a variety of settings. While these devices prove useful in a number of applications, they require the user to carry the device on their person. This can prevent or impede the user from engaging in other activities like for example, using lawn and garden equipment. Additionally, individuals may want to adapt existing audio equipment for use with lawn and garden equipment without buying a separate device. Accordingly, a need exists for a bracket device and audio equipment holder that allows for convenient mounting to a vehicle.

SUMMARY OF THE INVENTION

An object of the present invention comprises providing a convenient means for mounting audio equipment to a vehicle, like a lawn and garden tractor.

These and other objects of the present invention will become apparent to those skilled in the art upon reference to the following specification, drawings, and claims.

The present invention intends to overcome the difficulties encountered heretofore. To that end, the present invention comprises an audio equipment holder and bracket device that conveniently mounts to a vehicle. The device comprises a substantially planer platform for retaining the audio equipment, and at least one leg with the first end secured to the platform, and a second end terminating at a connection point that allows for releasable securement to the vehicle.

DETAILED DESCRIPTION OF THE INVENTION

Figure 1:
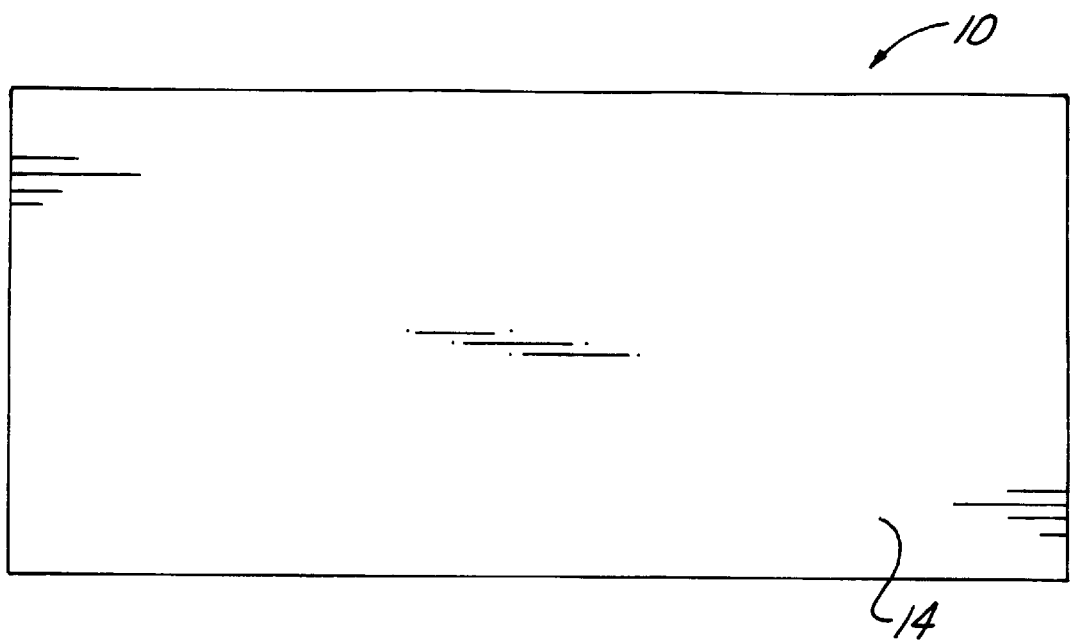
FIG. 1 is a top plan view of the radio bracket (without mounting feet).
Figure 2:
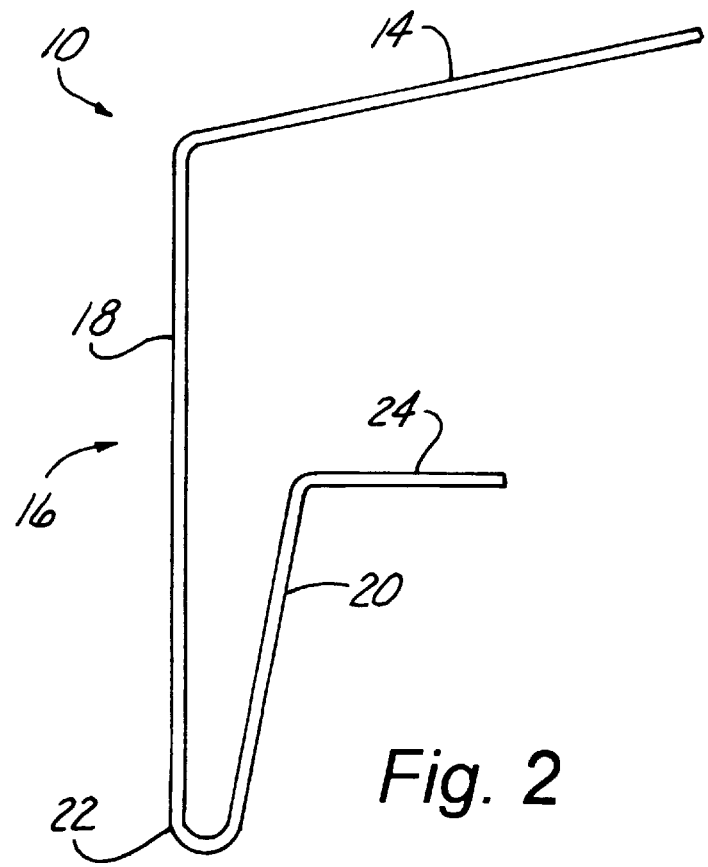
FIG. 2 is a side elevational view of the radio bracket.
Figure 3:
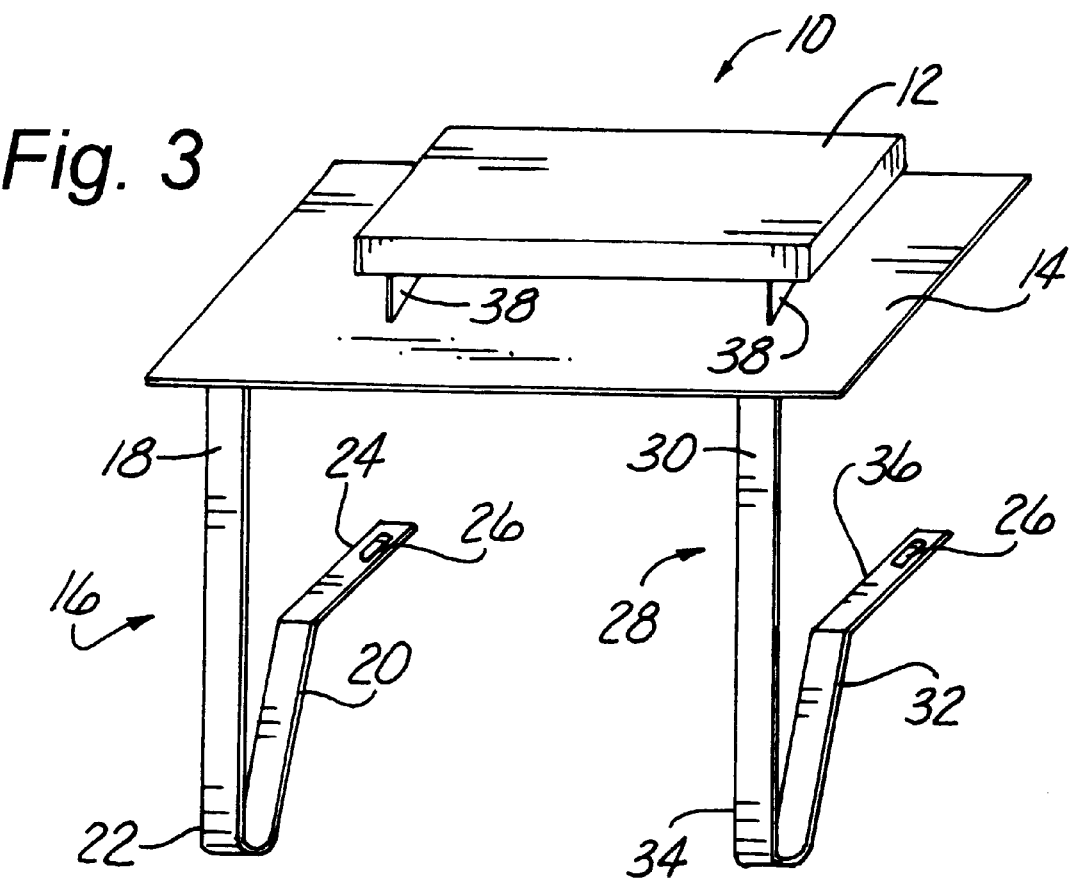
FIG. 3 is a perspective view of the radio bracket.

In the figures, FIG. 3 shows up bracket device 10 comprised of a platform 14, a first leg 16, and a second leg 28. A piece of audio equipment 12, mounts to the substantially planer platform 14 with mounting feet 38. In the preferred embodiment of the present invention the mounting feet 38 bolt to the platform 14 and secure to the audio equipment 12 in a suitable manner. For example, with screws, bolts, glue, and the like.

The first leg 16 includes a first end 18 that connects to the platform and extends away therefrom. Additionally, the first leg 16 also includes a second end 20 with a terminal portion 24, and a U-shaped central portion 22 connecting the first end 18 and the second end 20. The terminal portion 24 of the first leg 16 includes a bolt hole 26. In an identical manner, the second leg 28 also includes a first end 30, and a second end 32, with a terminal portion 36 including a bolt hole 26, and an U-shaped central portion 34 connecting the first end 30 and the second end 32.

Figure 4:
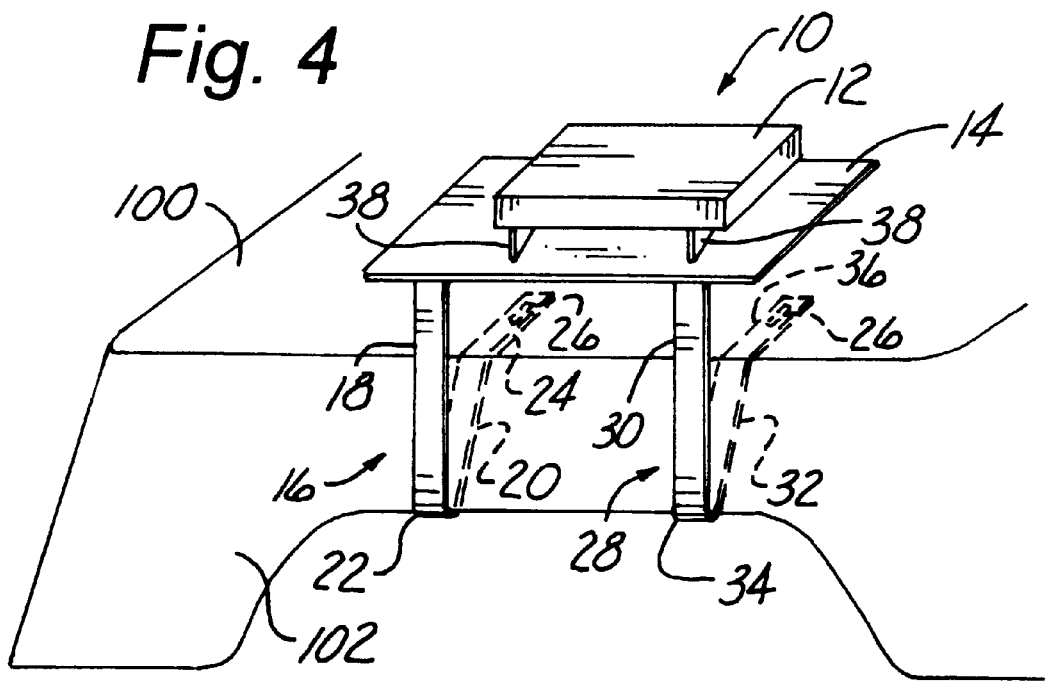
FIG. 4 is a perspective view of the radio bracket and tractor.

FIG. 4 shows that the first leg 16 and the second leg 28 releasable secure to a fender 102 of a lawn tractor 100. In particular, the U-shaped central portion 22 of the first leg 16, and the U-shaped central portion 34 of the second leg 28 capture the fender 102 of the lawn tractor 100. Bolts 40 secure through bolt holes 26 in the top side of the fender 102 thereby connecting the terminal portion 24 of the first leg 16 and the terminal portion 36 of the second leg 28 to the lawn tractor 100. Of course, those of ordinary skill in the art will realize that the present invention contemplates a wide variety of similar or equivalent mounting systems without departing from the scope of the intended invention.

In the preferred embodiment of the present invention the lawn tractor 100 is a lawn and garden tractor of the type available from John Deere. The particular advantage of using a John Deere lawn and garden tractor comprises the fact that the bracket 10 can mount to the fender of a John Deere lawn and garden tractor through the existing tractor hand-hold hardware in relatively little time, with simple tools, and without disfiguring or altering the tractor in any manner.

In the preferred embodiment of the present invention the radio bracket 12 is constructed of conventional spring steel stock. The platform 14 measures 8¼" by 4½" and ⅛" in thickness. The legs 16, 28 measure 7" in height, 1" in width, and ⅛" in thickness. From the bottom of the curved portion of the legs 16, 28 to the beginning of the terminal portion 22, 34 measures 3¾". The terminal portion 24, 36 of the legs 16, 28 measures 1¾" with a 5/16" bolt hole 26.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art that have the disclosure before them will be able to make modifications and variations therein without departing from the scope of the invention.

I claim:

1. A radio holder and bracket device for mounting to a fender of a lawn tractor, said device comprising:

a radio;

a lawn tractor having a fender with two bolt holes;

a substantially planer platform for releasable retention of said radio;

a first leg having a first end, a second end with a terminal portion having a bolt hole, and a U-shaped central portion connecting said first end and said second end;

wherein said first end of said first leg is connected to said platform, and said second end of said first leg is releasably secured to said fender of said lawn tractor with a bolt secured through said bolt hole in said terminal portion of said second end and through one of said bolt holes in said fender of said lawn tractor;

a second leg having a first end, a second end with a terminal portion having a bolt hole, and a U-shaped central portion connecting said first end and said second end;

wherein said first end of said second leg is connected to said platform, and said second end of said second leg is releasably secured to said fender of said lawn tractor with a bolt secured through said bolt hole in said terminal portion of said second end and through one of said bolt holes in said fender of said lawn tractor.

* * * * *